(12) United States Patent
Jaudon

(10) Patent No.: US 7,946,793 B2
(45) Date of Patent: May 24, 2011

(54) APPARATUS FOR DRILLING COLINEAR HOLES THROUGH CONCENTRIC PIPES

(75) Inventor: Phillip D. Jaudon, Harvey, LA (US)

(73) Assignee: Fastorq, LLC

( * ) Notice: Subject to any disclaimer, the term of this patent is extended or adjusted under 35 U.S.C. 154(b) by 660 days.

(21) Appl. No.: 12/057,901

(22) Filed: Mar. 28, 2008

(65) Prior Publication Data

US 2009/0245954 A1    Oct. 1, 2009

(51) Int. Cl.
*B23B 39/22* (2006.01)
*E21B 19/16* (2006.01)

(52) U.S. Cl. ........... 408/1 R; 166/55.2; 166/298; 408/37

(58) Field of Classification Search ................ 166/55.2, 166/85.1, 297–298, 377; 408/1 R, 104–107, 408/36–41, 234, 110–112; B23B 39/22
See application file for complete search history.

(56) References Cited

U.S. PATENT DOCUMENTS

| | | | | |
|---|---|---|---|---|
| 2,877,670 A * | 3/1959 | Allen | ................................. | 408/4 |
| 2,890,730 A * | 6/1959 | Gottlieb | ........................... | 408/39 |
| 3,746,459 A * | 7/1973 | Kindelan | ......................... | 408/37 |
| 4,009,545 A * | 3/1977 | Rossborough | ................... | 408/88 |
| 4,222,687 A * | 9/1980 | Williams | ......................... | 408/79 |
| 7,021,381 B1 * | 4/2006 | Remedies et al. | ............. | 166/298 |
| 7,621,321 B1 * | 11/2009 | Remedies et al. | ........... | 166/85.1 |
| 7,704,020 B1 * | 4/2010 | Stengel | ............................. | 408/35 |
| 2006/0231291 A1 | 10/2006 | Johannessen | | |

FOREIGN PATENT DOCUMENTS

| | | |
|---|---|---|
| WO | WO03104608 | 12/2003 |
| WO | WO2004063525 | 7/2004 |

\* cited by examiner

*Primary Examiner* — Daniel W Howell
(74) *Attorney, Agent, or Firm* — Claude E. Cooke, Jr.; Burleson Cooke LLP

(57) ABSTRACT

Apparatus for drilling holes through concentric pipes is provided. The apparatus clamps on the exterior pipe and contains drilling assemblies that may be used for drilling sequentially or simultaneously two colinear holes.

8 Claims, 5 Drawing Sheets

APPARATUS FOR DRILLING COLINEAR HOLES THROUGH CONCENTRIC PIPES

BACKGROUND

1. Field of the Invention

This invention relates to apparatus for drilling colinear (in the same line) holes in opposite directions through the walls of concentric pipes to form a single hole through the pipes. It is particularly applicable to large pipes such as casing used in wells.

2. Description of Related Art

After wells have produced to an economic limit it is necessary to remove pipes (casing) from the wells as part of abandoning the wells. There are normally several concentric casing strings to be removed. In offshore operations it may be desirable to reclaim a slot to drill a new well, eliminate a slot to reduce wave loading on a platform structure or to detach and remove a platform structure. When retrieving casing(s) it is normal practice to cold cut the casing(s) with an external saw into lengths that are within the safe lifting capacity of the available lifting apparatus.

Prior to removal of casing at the surface of a well, the well is plugged and all tubing and production casing that are free are removed from the well. An internal mechanical cutter may then be used to cut the remaining casings at a predetermined depth below the mud line. Once the down-hole internal cut has been completed it is desirable to form a hole through the diameter of the concentric pipes. Once the hole has been formed, a metal pin is inserted through the hole. During the cutting operation, the internal pipes may become displaced from the external pipe, causing inefficient cutting time and or damage to the saw. There is a need to stabilize the location of the concentric pipes.

The pin is left protruding out of the exterior pipe on each side of the concentric pipes. The first set of drilled holes is located at the upper end of the pipes, allowing sufficient metal above the holes for the metal pin to secure the inner pipes and to support the string weight of the pipes. The pin may then be used as a lifting device by attaching slings over the protruding ends of the pin and securing slings by sliding keeper plates with pin holes onto the pin against the slings and then installing keeper bolts through the pin diameter on each end. Once the slings are properly secured the pipes may then be safely lifted by means of winches, casing jacks, or a drilling rig to a selected length above the rig floor or work deck and then held in place by bowl and slips on the outermost casing. The process of forming holes simultaneously through the diameter of the pipes is then repeated a few feet above the bowl and slips and a second pin is installed through the pipes. Once the second pin has been installed, the pipes may then be cut with an external saw at a safe distance above the second pin to allow adequate casing material for the pin to secure the inner pipes and support the remaining string weight. Once the sawing operation is completed the first sectioned length of pipes may be removed and laid down Once the sectioned length of pipes has been laid down, the slings and the metal pin are removed. Wire cables may then be run through the drilled holes and secured with cable clamps to prevent internal pipes from sliding out during transportation. The securing cables are a safety precaution only and are not to be used as a lifting point. The process of securing the slings is then repeated onto the second pin, the slips are removed from the bowl, and the pipes may again be lifted to the determined length above the rig floor or work deck. The slips are then replaced into the bowl. The process of drilling, pinning, sawing, and laying down of sectioned pipes is repeated until the entire string of pipes has been removed.

The procedure described above is a typical method of recovering pipes from a platform well. However, there may be variations to the procedure based on platform structure and available work space. The forming of holes, pinning, and sawing process, for example, may be performed at the well bay level or other levels of the platform structure. Also, when bowl and slips are not available or practical for a given project, support beams may be used to hold the string weight. This method requires the same process as described above with the exception of an additional drill- and pin-step. Once the downhole internal cut has been completed the first set of holes may be formed and pinned at the upper end of pipes to secure slings and lift the pipes to a determined length above the rig floor and/or work deck. The second set of holes may then be formed and pinned just above the support beams. The pipe string load is then lowered until the pin material protruding through each side of the diameter of the pipes comes to rest on the support beam to hold the string weight. A third set of holes may then be formed and pinned just above the second pin to be used later as a pick up point. The pipes may then be cut with an external saw above the third pin. The length of sectioned pipes is then laid down, the pin removed and cables installed through the holes. The pipe removal process is continued by securing the slings onto the remaining upper pin, lifting the pipe to a level for safe removal of the lower pin previously resting on support beam, and then lifting pipe to the determined length above the rig floor and/or work deck. The procedure is repeated until the entire pipe string has been removed.

The hole through the concentric pipes may be formed by torch and by chipping cement between pipes. This procedure is slow and requires great care to remain safe. A drill may be used to drill a single hole through the concentric pipes, but this requires a long drill and consumes excessive time. What is needed is apparatus and method for forming colinear holes through concentric pipes and any material in the annuli between the pipes in a safe, efficient and cost-effective procedure. The apparatus should be adapted for use on concentric casings in wells that are located either on land or offshore at depths accessible to divers.

SUMMARY

Apparatus is provided for cutting colinear holes through the walls of concentric pipes. Normally, the apparatus is used to drill simultaneously from opposite sides of the outside pipe. Drilling assemblies operated by hydraulic power include hydraulic motors to turn each bit and cylinders to move the bits linearly on a carriage adapted to move along rigid rods. The drilling assemblies are attached to clamping apparatus, which provides for rigid attachment to pipes over a range of sizes. Power may be controlled by a module attached to the drilling assemblies or by a remote module.

DETAILED DESCRIPTION

Figure 1:
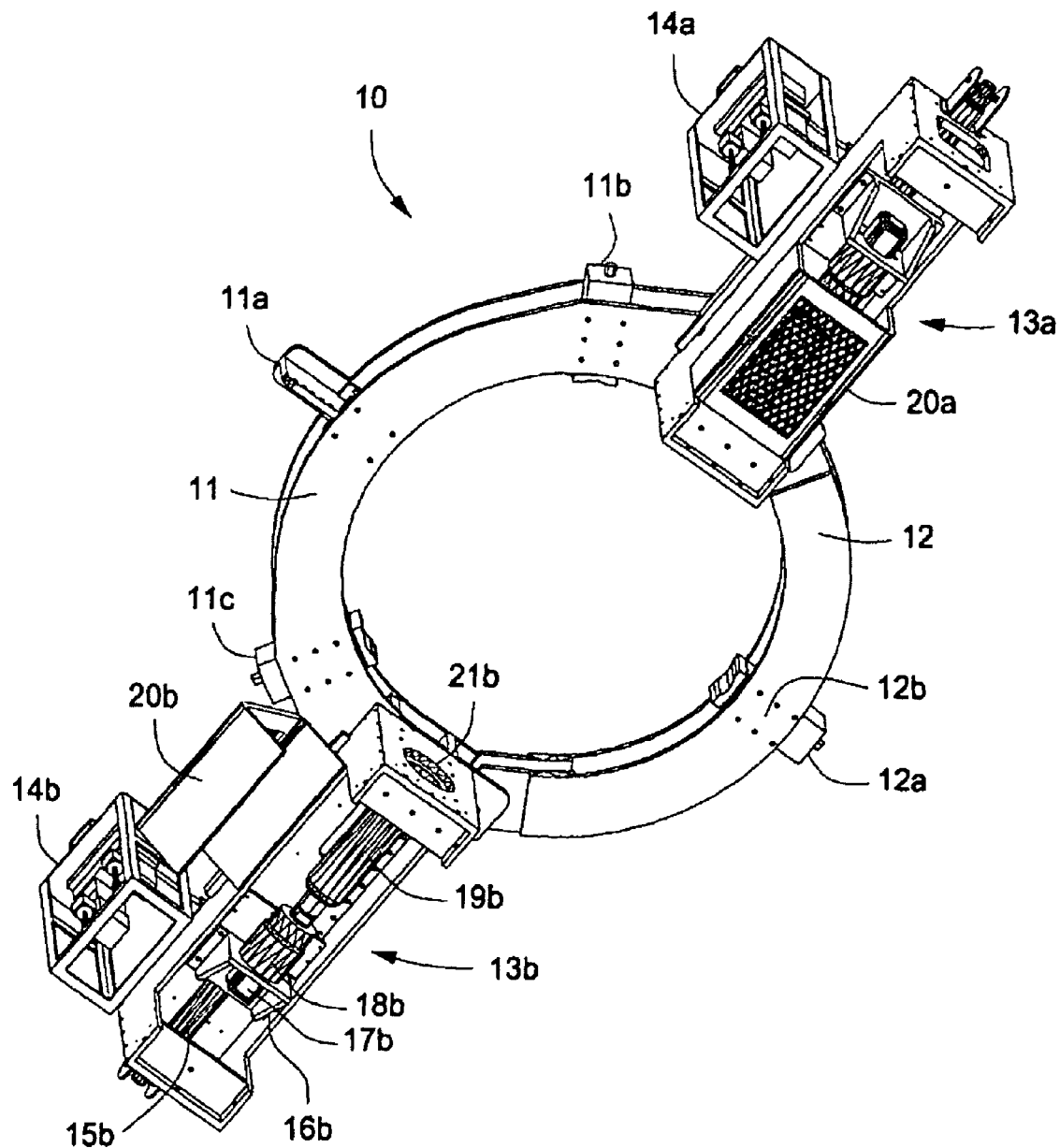
FIG. 1 is a perspective view of one embodiment of the disclosed apparatus.

FIG. 1 shows apparatus 10 for drilling colinear holes through pipes. Drilling assemblies 13*a* and 13*b*, normally identical, are disposed 180 degrees apart on clamp 11, which is joined by hinge to clamp swing door 12. Control modules 14*a* and 14*b* are joined to the drilling assemblies. Adjustable pick up bar 11*a*, and two feed screw jaws: 11*b* and 11*c* are shown on clamp 11. One feed screw jaw, 12*a*, is shown on clamp swing door 12. Each feed screw jaw may be adjusted according to casing size by means of adjustable mounting holes 12*b* and used to clamp a pipe by use of feed screws in the feed screw jaws. Clamp assembly 11 and 12 may be adapted to enclose up to a 36-inch pipe, for example. Clamp swing door 12 may be opened to allow apparatus 10 to be positioned on the external casing wall. When clamp swing door 12 is closed around the pipe and pinned to clamp body 11, clamp swing door feed screw jaw 12*a* is extended into the pipe and compression is applied to all feed screw jaws through casing tong dies, which will be described in more detail below. Clamp and feed screw jaws are preferably adjusted such that drill bit guides 21 are preferably positioned near the inside diameter of the clamp and within 2 inches of the wall of the external pipe. This design feature helps keep the two drilling mechanism rigidly mounted 180° apart to ensure accuracy of the opposing colinear holes. The overall design of the apparatus minimizes set-up time in securing the drilling device to the external casing, which is important in drilling and well abandonment operations, and maximizes casing size-range adjustment. The two colinear holes may be drilled in sequence or simultaneously, but an important feature of the apparatus is that drilling the two holes simultaneously can cut the time required for drilling in half Particularly in areas where operation time is expensive, such as offshore, this saving in time is important.

FIG. 1 also shows hydraulic cylinder 15*b*, which provides a controlled linear force to move carriage 16*b* along rails, which are described below. Attached to carriage 16*b* is hydraulic motor 17*b* and pillow block spindle 18*b*. Pillow block spindle 18*b* rotates drill bit 19*b*. Drilling fluid, normally water, is directed through drill bits 19*a* and 19*b*. The drill bit may be a variety of types such as a hole saw, core bit or plate cutter, and may range from 2-inch to 8-inch diameter with lengths up to 16 inches, for example. Safety guard covers 20*a* and 20*b* are preferably put in place over the drilling apparatus before it is started.

Figure 2:
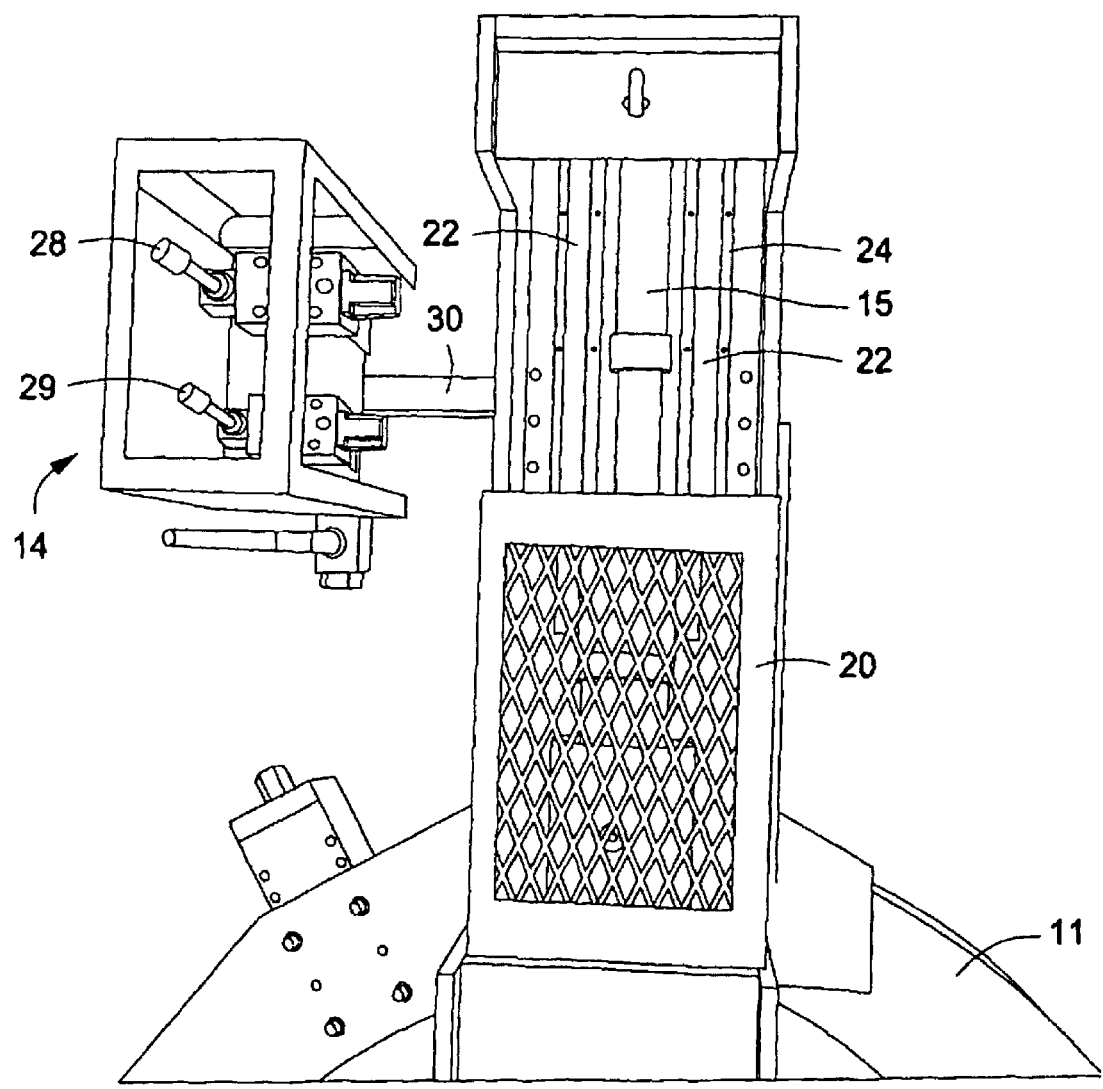
FIG. 2 is a top perspective view of a drill box assembly and remote control stand of the disclosed apparatus.

Referring to FIG. 2, a top view of the bit guiding and driving parts of the apparatus is shown. Hydraulic cylinder 15 drives a carriage, which drives the bit, both of which are covered by safety guard cover 20, It is important that the drive apparatus of the bit be rigid, so that sideways force on the bit does not significantly divert it from a line between the bits. The carriage moves along rods 22, as will be shown in detail below, and the rods are held rigidly by rails 24. The rails are preferably made of an aluminum alloy extrusion. The rigidity allows accurately drilled colinear holes from the drilling assemblies. Hitch 30 may be used to attach control modules 14 to the drilling assemblies. Control modules contain at least two controls—control 28 for hydraulic cylinder 15 and control 29 for hydraulic motor 17. Alternatively, control module 14 may be located far remote from the drilling assemblies. For example, control module 14 may be in a boat and the drilling modules may be at the sea floor, or on another deck of a fixed or floating facility, connected by hoses.

Figure 3:
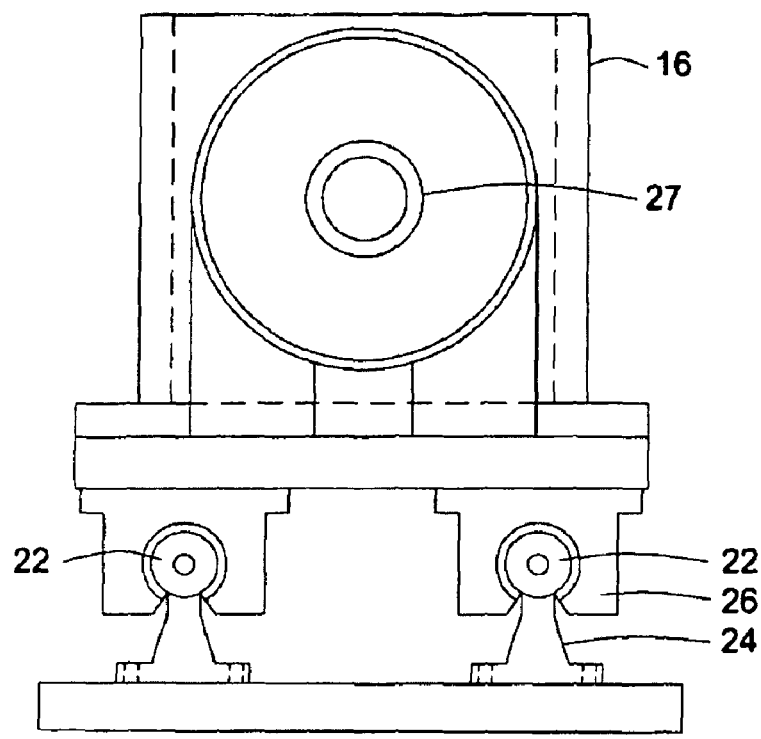
FIG. 3 is an end elevation view of the drilling module with drill bit.
Figure 4:
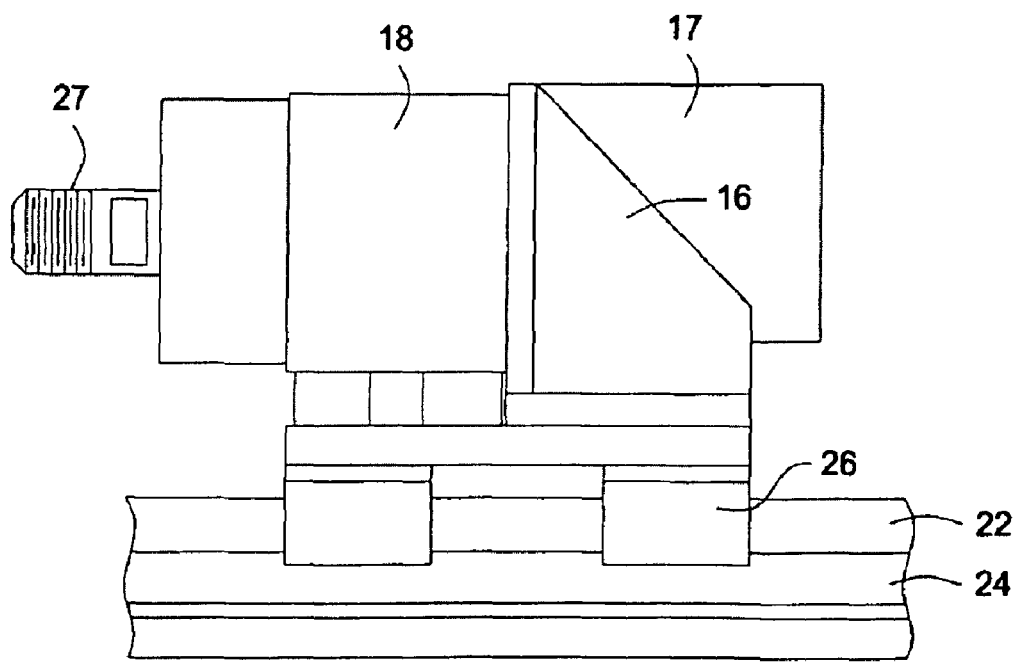
FIG. 4 is a side elevation view of the carriage for the drill bit.

Referring to FIG. 3, pillow block bearings 26 ride on rods 22 supported by rigidly mounted rod support rails 24. Carriage 16 provides a rigid mount for pillow block spindle 18, which may utilize male 1¼ inch-diameter seven-thread spindle shaft 27 to rotate drill bit 19*b*, as shown in FIG. 1. An elevation view is shown in FIG. 4, also showing hydraulic motor 17, pillow block spindle 18 and spindle shaft 27.

Figure 5:
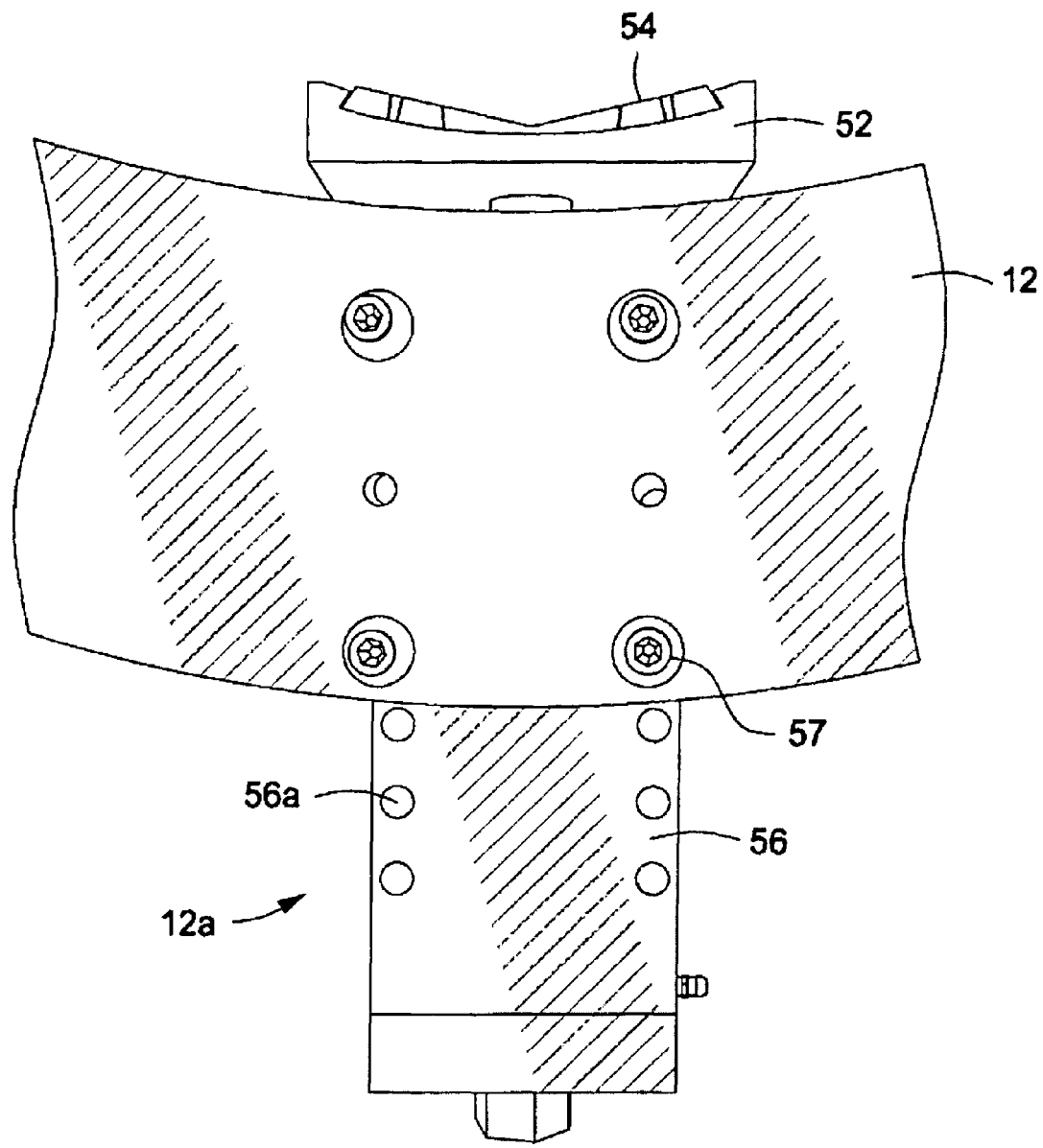
FIG. 5 is a top view of a section of the clamp swing door and feed screw jaw.

FIG. 5 is a top view of clamp 12 with foot pad 52 bolted in place by bolts 57. Holes in clamp 12 and holes 56*a* in screw body 56 of feed screw jaw 12*a* allow adjustment of the diameter of a circle passing through casing tong dies 54 for casing having different diameters. FIG. 5 illustrates adjustment of apparatus 10 (FIG. 1) for drilling through maximum diameter casing for which the clamp is constructed.

Light-weight aluminum construction and modular design of the device allow for rapid assembly, disassembly, and adjustments in confined spaces such as on lower decks of offshore structures. The modular assemblies may be individually moved to confined space areas and quickly assembled. The two drill box assemblies 13 are secured onto clamp 11 by bolts. Remote control stands 14 may be attached to the clamp by inserting the 1½ inch square stock hitch 30, shown in FIG. 2, into a 1½ inch inner dimension square tubing receiver mount and pinned with quick-release ball locking pins.

Design features of the drilling device allow for use in subsea applications when operated by divers. The apparatus may be lowered to the seafloor and clamped to casing as on land. The remote control stand may be operated bottom-side by divers or may be removed from the hitch position on the clamp and used top-side with appropriate lengths of hose leads.

Figure 6:
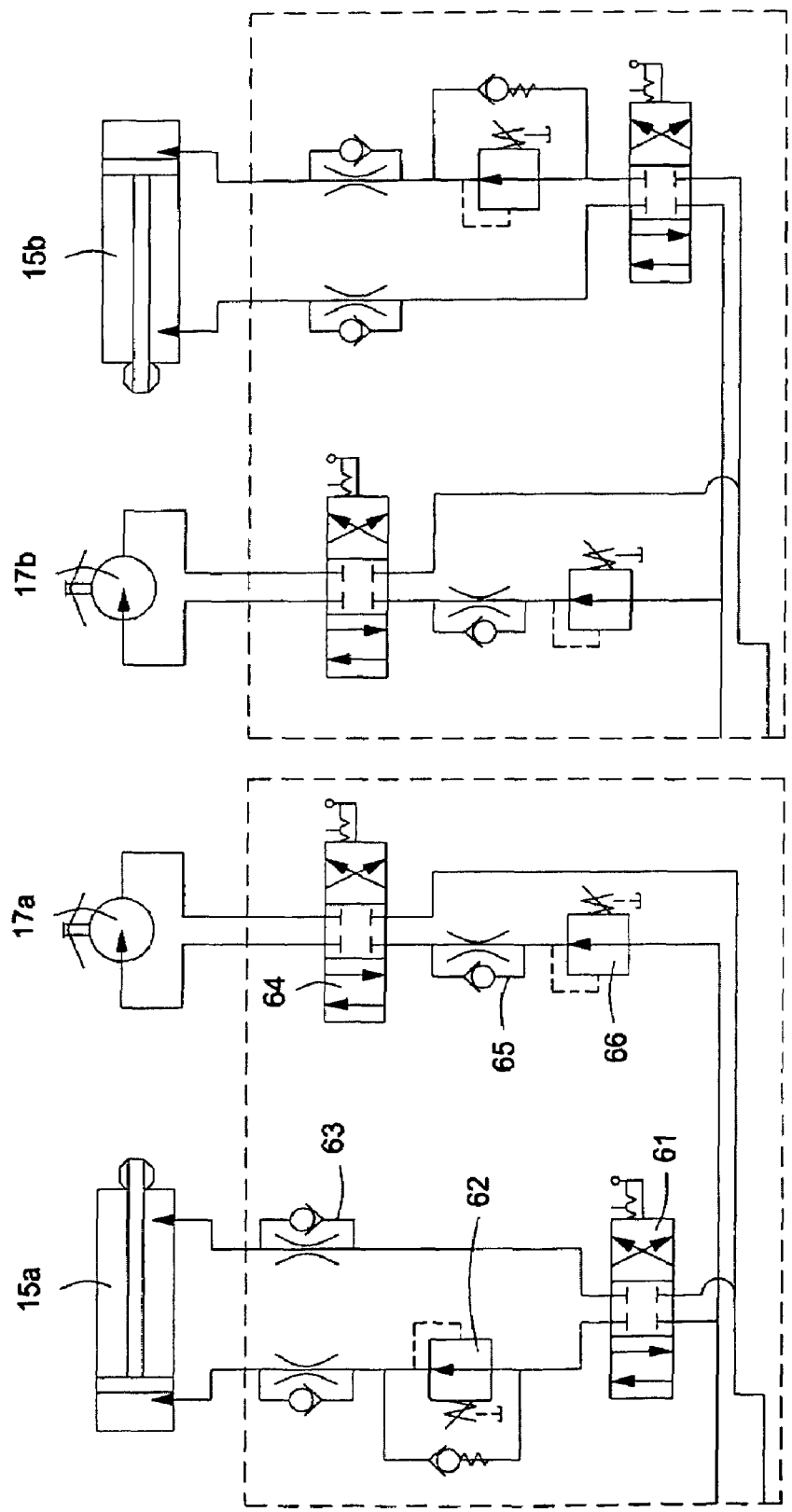
FIG. 6 is a schematic of a hydraulic circuit for the disclosed apparatus.

Hydraulic circuits illustrating apparatus suitable for use with the drilling apparatus are shown in FIG. 6. Controls for hydraulic cylinder 15*a* are four-way valve with three-position centered detent 61, pressure regulator 62 and flow control with by-pass 63. Controls for hydraulic motor 17*a* are four-way valve with three position centered detent 64, flow control with by-pass 65, and pressure regulator 66.

For forming a hole through the wall of one or more strings of pipe, which may have cement in the annuli between the pipes, the apparatus is first clamped to the outside pipe. The drill bits are preferably fed by the single stage hydraulic cylinders into the wall of the external pipe at an optimal rate of speed until the casing wall has been penetrated. When the bit has entered cement, the feed rate may be increased to drill through a softer cemented annulus material until the next inner casing wall is reached. The feed rate may be reduced to an optimum feed rate for the harder metal casing inside the larger casing. This process is continued until the inner-most casing wall has been penetrated by each bit. The feed rate may be adjusted throughout the drilling process by monitoring hydraulic panel mounted gauges. The hydraulic cylinder gauge will register an increase in hydraulic pressure when drilling through the harder casing material, indicating the need to lower the pressure to slow down penetration rate, and will register a decrease in hydraulic pressure when drilling through the softer cemented annulus material, indicating the need to increase hydraulic pressure to increase the penetration rate.

Although the process of drilling colinear holes using a pair of drilling assemblies and bits has been described assuming that the holes are drilled simultaneously, it should be understood that the holes may be drilled sequentially or at various drilling rates with each assembly and bit. This could be desirable, for example, if hydraulic power to the apparatus is limited.

Although the present invention has been described with respect to specific details, it is not intended that such details should be regarded as limitations on the scope of the invention, except as and to the extent that they are included in the accompanying claims.

I claim:

1. Apparatus for drilling colinear holes through pipes, comprising:
   a clamp adapted for enclosing an outside pipe, the clamp having an inside diameter and a door sized to pass the outside pipe into the clamp and adjustable devices disposed at selected positions around the inside diameter of the clamp for holding the clamp to the outside pipe;
   a pair of drilling assemblies, each of the drilling assemblies being attached to the clamp and comprising a hydraulic motor and a mechanism for connecting the motor to a bit, the bit having an axis for drilling, and a carriage, the carriage having a rigid slidable support and being driven along the support by hydraulic apparatus, the rigid slidable support being disposed such that the axes for drilling of the bits are colinear; and
   a pair of control modules for the drilling assemblies.

2. The apparatus of claim 1 further comprising a pair of bit guides, the bit guides being disposed 180 degrees apart on the clamp so as to guide the axes for drilling of the bits along the same line.

3. The apparatus of claim 1 wherein the control modules are remotely located from the drilling assemblies.

4. The apparatus of claim 1 wherein the control modules are attached to the drilling assemblies.

5. The apparatus of claim 1 wherein the control modules comprise a four-way valve, a pressure regulator and a flow control with by-pass.

6. A method for forming a hole through concentric pipes, comprising:
   placing a clamp adapted for enclosing an outside pipe, the clamp having an inside diameter and a door sized to pass the outside pipe into the clamp, around the outside pipe and operating adjustable devices disposed at selected positions around the inside diameter of the clamp to hold the clamp to the outside pipe;
   providing a pair of drilling assemblies and bits, each of the drilling assemblies being attached to the clamp and comprising a hydraulic motor and a mechanism for connecting the motor to the bit, the bit having an axis for drilling, and a carriage, the carriage having a rigid slidable support and being driven along the support by hydraulic apparatus, the rigid slidable support being disposed such that the axes for drilling of the bits are colinear and in opposite directions;
   providing a pair of control modules for the drilling assemblies and hydraulically connecting a control module to at least one of the drilling assemblies; and
   providing hydraulic power to at least one of the hydraulic motors and the hydraulic apparatus and operating at least one of the control modules so as to form at least a part of the hole through the concentric pipes.

7. The method of claim 6 wherein the clamp further has attached thereto a pair of bit guides, the bit guides being disposed 180 degrees apart on the clamp so as to guide the axes for drilling of the bits along the same line.

8. The method of claim 6 wherein the control module and the hydraulic power are connected from the water surface to drilling assemblies disposed subsea.

* * * * *